(12) United States Patent
Shue et al.

(10) Patent No.: US 8,523,102 B2
(45) Date of Patent: Sep. 3, 2013

(54) METHOD AND APPARATUS FOR AIRCRAFT SENSOR AND ACTUATOR FAILURE PROTECTION USING RECONFIGURABLE FLIGHT CONTROL LAWS

(75) Inventors: Shyhpyng Jack Shue, Grapevine, TX (US); John James Corrigan, Coppell, TX (US); Eric Thomas Bird, Weatherford, TX (US); Tommie Lynn Wood, Arlington, TX (US); Alan Carl Ewing, Keller, TX (US)

(73) Assignee: Textron Innovations Inc., Providence, RI (US)

(*) Notice: Subject to any disclaimer, the term of this patent is extended or adjusted under 35 U.S.C. 154(b) by 198 days.

(21) Appl. No.: 13/121,458

(22) PCT Filed: Oct. 5, 2009

(86) PCT No.: PCT/US2009/059548
§ 371 (c)(1),
(2), (4) Date: Mar. 29, 2011

(87) PCT Pub. No.: WO2010/096104
PCT Pub. Date: Aug. 26, 2010

(65) Prior Publication Data
US 2011/0180656 A1 Jul. 28, 2011

Related U.S. Application Data

(60) Provisional application No. 61/102,630, filed on Oct. 3, 2008.

(51) Int. Cl.
*B64C 13/16* (2006.01)
*B64C 13/18* (2006.01)

(52) U.S. Cl.
USPC ........... 244/17.13; 244/194; 244/195; 701/11

(58) Field of Classification Search
USPC .............. 701/3–6, 8, 11; 244/99.4, 194, 195
See application file for complete search history.

(56) References Cited

U.S. PATENT DOCUMENTS

| D453,317 S | 2/2002 | DeTore et al. |
| 6,622,972 B2 | 9/2003 | Umes, Sr. et al. |

(Continued)

FOREIGN PATENT DOCUMENTS

WO 97/20735 6/1997

OTHER PUBLICATIONS

International Search Report mailed by ISA/USA, U.S. Patent and Trademark Office on Apr. 26, 2010 for International Patent Application No. PCT/US09/59548.

(Continued)

*Primary Examiner* — Philip J Bonzell
(74) *Attorney, Agent, or Firm* — James E. Walton; Damon R. Hickman

(57) ABSTRACT

A method and apparatus for reconfiguring flight control of an aircraft during a failure while the aircraft is flying. The method and apparatus provide a control law that is software-implemented and configured to automatically send flight control data to a mixing/mapping matrix and a reconfiguration management tool configured to communicate with the mixing/mapping matrix in order to safely transfer authority from a failed actuator to a back-up actuator. A sensor management tool is provided for input to the reconfiguration management tool in order to smooth any transient conditions that may occur during reconfiguration. The method and apparatus provide for a way of smoothing any possible transient situation that might otherwise occur by employment of a fader, the fader being used to gradually convert positioning of failed actuators and positioning of reconfigured actuators.

19 Claims, 15 Drawing Sheets

(56) References Cited

U.S. PATENT DOCUMENTS

2005/0080495 A1    4/2005    Tessier et al.
2008/0077284 A1    3/2008    Swope
2008/0097658 A1    4/2008    Shue et al.

OTHER PUBLICATIONS

International Preliminary Report on Patentability mailed by IPEA/USA, U.S. Patent and Trademark Office on Mar. 30, 2011 for International Patent Application No. PCT/US09/59548.

| Control No. | Control Name | Description | Comments |
|---|---|---|---|
| 1 | $\delta_{Coll}$ | Collective | Main |
| 2 | $\delta_{F/A}$ | F/A | Main |
| 3 | $\delta_{Lat}$ | Lateral | Main |
| 4 | $\delta_{Ped}$ | Pedal | Main |
| 5 | $Flap_1$ | Right Front Outboard | Main |
| 6 | $Flap_2$ | Left Front Outboard | Main |
| 7 | $Flap_3$ | Right Front Mid-board | Main |
| 8 | $Flap_4$ | Left Front Mid-board | Main |
| 9 | $Flap_5$ | Right Front Inboard | Main |
| 10 | $Flap_6$ | Left Front Inboard | Main |
| 11 | $Flap_7$ | Right Rear Outboard | Main |
| 12 | $Flap_8$ | Left Rear Outboard | Main |
| 13 | $Flap_9$ | Right Rear Mid-board | Main |
| 14 | $Flap_{10}$ | Left Rear Mid-board | Main |
| 15 | $Flap_{11}$ | Right Rear Inboard | Main |
| 16 | $Flap_{12}$ | Left Rear Inboard | Main |
| 17 | $Flap_{13}$ | Right Rear Inner Trim | Trim |
| 18 | $Flap_{14}$ | Left Rear Inner Trim | Trim |
| 19 | $Flap_{15}$ | Right Twin Fins | Rudder Trim |
| 20 | $Flap_{16}$ | Left Twin Fins | Rudder Trim |

FIG. 7A

| Control No. | Control Name | Description | Comments |
|---|---|---|---|
| 21 | $Wing_1$ | Right front wing | N/A |
| 22 | $Wing_2$ | Left front wing | N/A |
| 23 | $Wing_3$ | Right rear wing | N/A |
| 24 | $Wing_4$ | Left rear wing | N/A |
| 25 | $R^1_{Coll}$ | Rotor 1 Collective (Right front) | Main |
| 26 | $R^1_{F/A}$ | Rotor 1 F/A (Right front) | Main |
| 27 | $R^1_{Lat}$ | Rotor 1 Lateral (Right front) | Main |
| 28 | $R^2_{Coll}$ | Rotor 2 Collective (Left front) | Main |
| 29 | $R^2_{F/A}$ | Rotor 2 F/A (Left front) | Main |
| 30 | $R^2_{Lat}$ | Rotor 2 Lateral (Left front) | Main |
| 31 | $R^3_{Coll}$ | Rotor 3 Collective (Right rear) | Main |
| 32 | $R^3_{F/A}$ | Rotor 3 F/A (Right rear) | Main |
| 33 | $R^3_{Lat}$ | Rotor 3 Lateral (Right rear) | Main |
| 34 | $R^4_{Coll}$ | Rotor 1 Collective (Left rear) | Main |
| 35 | $R^4_{F/A}$ | Rotor 1 F/A (Left rear) | Main |
| 36 | $R^4_{Lat}$ | Rotor 1 Lateral (Left rear) | Main |

*FIG. 7B*

| Control No. | Control Name | Description | Comments |
|---|---|---|---|
| 37 | $\beta^1_{F/A}$ | Nacelle 1 F/A (Right front) | Main |
| 38 | $\beta^1_{Lat}$ | Nacelle 1 Lateral (Right front) | N/A |
| 39 | $\beta^2_{F/A}$ | Nacelle 2 F/A (Left front) | Main |
| 40 | $\beta^2_{Lat}$ | Nacelle 2 Lateral (Left front) | N/A |
| 41 | $\beta^3_{F/A}$ | Nacelle 3 F/A (Right rear) | Main |
| 42 | $\beta^3_{Lat}$ | Nacelle 3 Lateral (Right rear) | N/A |
| 43 | $\beta^4_{F/A}$ | Nacelle 4 F/A (Left rear) | Main |
| 44 | $\beta^4_{Lat}$ | Nacelle 4 Lateral (Left rear) | N/A |
| 45 | $\Omega$ | RPM | Airplane |

*FIG. 7C*

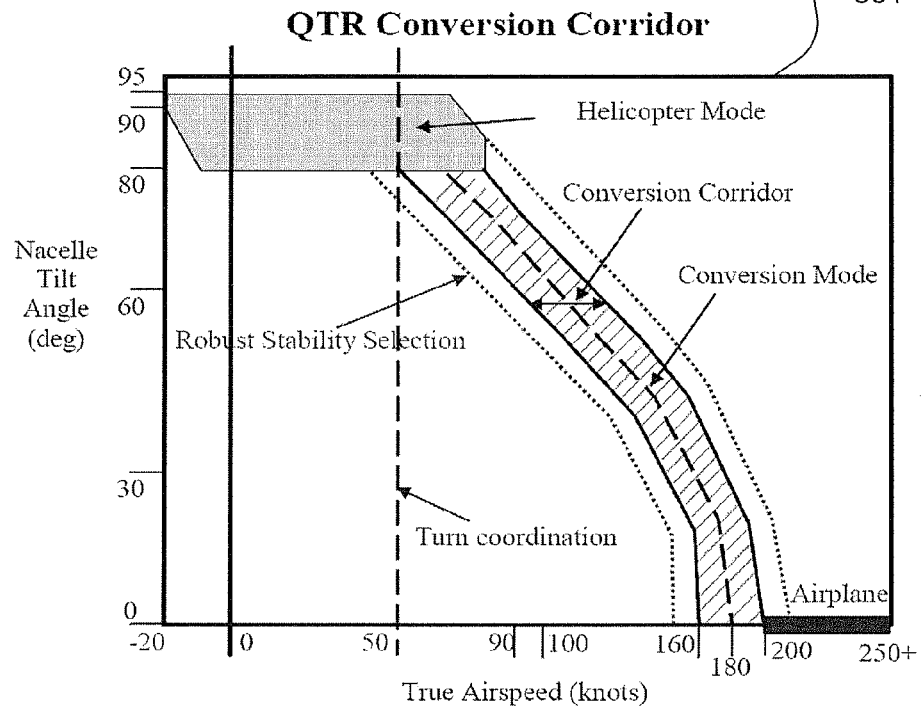

*FIG. 8*

| Helicopter Mode | Cockpit Control | Aircraft Surfaces | Settings |
|---|---|---|---|
| Vertical Control | Throttle (0, 4 inch) | Rotor Collective of four | $40.13° \leq \delta_{Coll} \leq 90.63°$ |
| Longitudinal Control | F/A stick (± 4 inch) | Rotor F/A Flapping And / Or DCP (Front to Back) | $-10° \leq \delta_{F/A} \leq 10°$ And / Or $-5.60° \leq \delta_{DCP} \leq 5.60°$ |
| Lateral Control | Lateral Stick (± 4 inch) | Rotor Lateral Flapping And / Or DCP (Side to Side) | $-8° \leq \delta_{Lat} \leq 8°$ + $-2.25° \leq \delta_{DCP} \leq 2.25°$ |
| Directional Control | Pedal (± 2 inch) | Max. Differential Lat & F/A swash-plate Rotor Flapping | $(-8° \leq \delta_{rotor\_flap} \leq 8°)$ |
| Flaperon setting | Flap Level | Aircraft wing flaps | $30° \leq Flap \leq 75°$ |
| Nacelle Tilt Angle | Knob (or wheel) | Aircraft F/A Nacelles | $\beta_{F/A} \geq 80°$ |

FIG. 15

| Airplane Functions | Cockpit Control | Aircraft Surfaces | Settings |
|---|---|---|---|
| Vertical Control | F/A Stick | Elevators (differential front and rear flaps) | $-20° \leq \delta_{elev} \leq 20°$ |
| Longitudinal Control | Throttle | Collective | $60.8° \leq \delta_{Coll} \leq 99.13°$ |
| Lateral Control | Lat. Stick | Wing Flaps | $-20° \leq \delta_{flap} \leq 20°$ |
| Directional Control | Pedal (± 2 inch) | Single Rotor DCP | $-2° \leq \delta_{DCP} \leq 2°$ + |
| Flaperon setting | Flap Level | Aircraft flaps | $0° \leq Flap \leq 30°$ |
| Nacelle Tilt Angle | Knob | Aircraft F/A Nacelles | Down-locked |

FIG. 16

METHOD AND APPARATUS FOR AIRCRAFT SENSOR AND ACTUATOR FAILURE PROTECTION USING RECONFIGURABLE FLIGHT CONTROL LAWS

TECHNICAL FIELD

The system of the present application relates in general to the field of flight control for aircraft. In particular, the system relates to apparatus and methods for using reconfigurable flight control laws to operate an aircraft during sensor and actuator failure.

BRIEF DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

FIGS. 7A-7C represent a listing of exemplary actuators on the quad tilt rotor;

FIG. 8 is graph showing the relationship between helicopter mode, airplane mode, and conversion mode as a function of rotor tilt angle and airspeed;

FIG. 15 is chart summarizing the primary controls of the quad tilt rotor while in helicopter mode;

FIG. 16 is chart summarizing the primary controls of the quad tilt rotor while in airplane mode;

Figure 1:
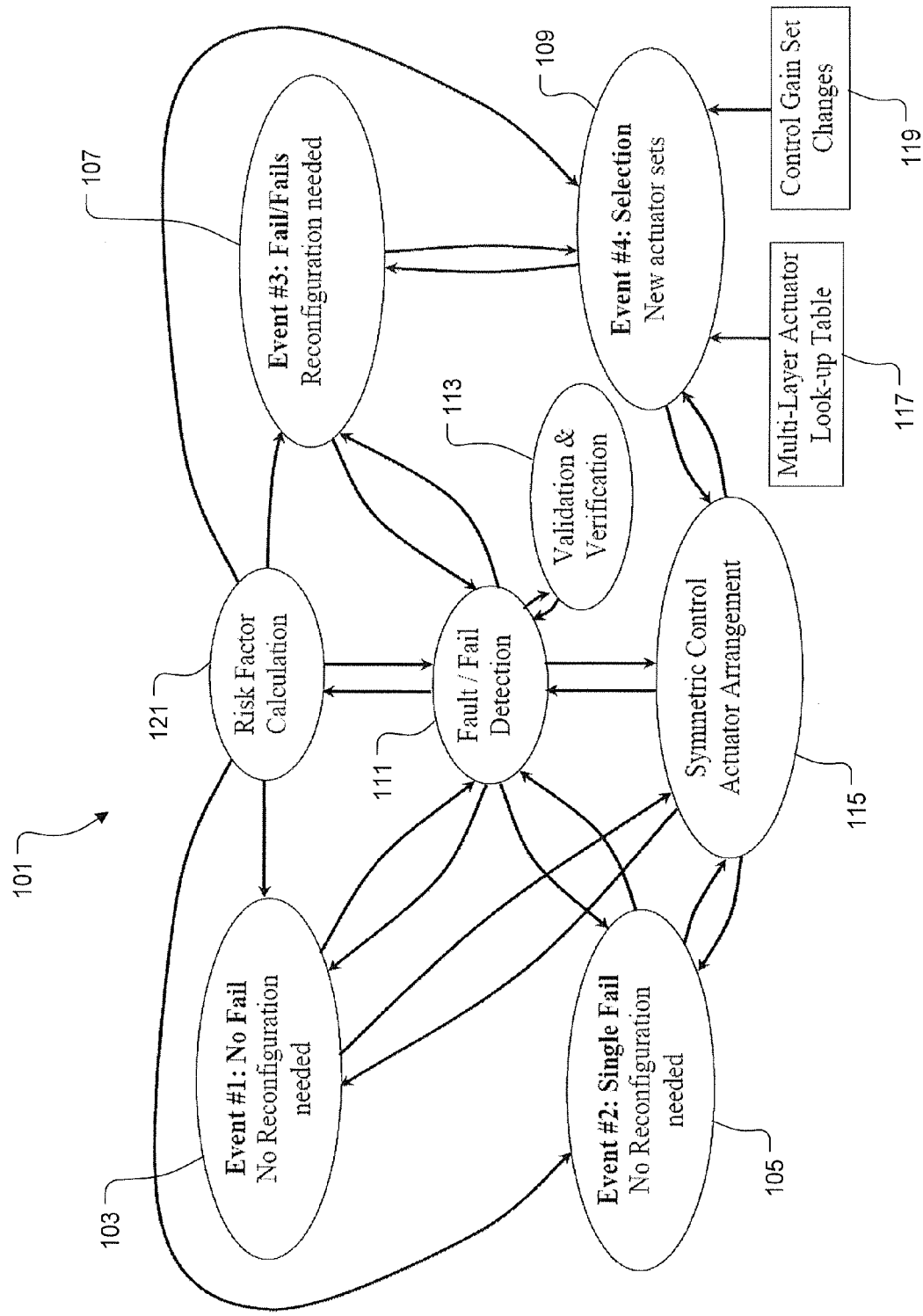
FIG. 1 is a reconfiguration management tool according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

An aircraft during flight is susceptible to a variety of failure scenarios that can potentially be life threatening for the crew and passengers on board, as well as destructive to the aircraft itself. Examples of failure scenarios are: engine failure, control actuator failure, control surface damage from in flight collision with an object, battle damage sustained to a military aircraft, and sensor failure, to name a few. Because most modern day aircraft are controlled using a computer system with flight control laws, a failure scenario mentioned above can quickly result in catastrophic situation do to the flight control laws not being reconfigurable in such a scenario. As a simplified example, if a multi-engine aircraft were to lose an engine during flight, and if the flight control laws were not reconfigurable, then the aircraft may not be able to survive the incident even though the aircraft potentially could have used alternate aircraft actuators to compensate for the loss off an engine and therefore maintain control of the aircraft. Reconfigurable flight control laws are desirable on all aircraft; however, aircraft having multiple and/or redundant flight control actuators are more attractive for implementation of a reconfigurable flight control system. It should be appreciated that the reconfigurable flight control system disclosed herein can be implemented on a variety of aircraft.

Figure 2A:
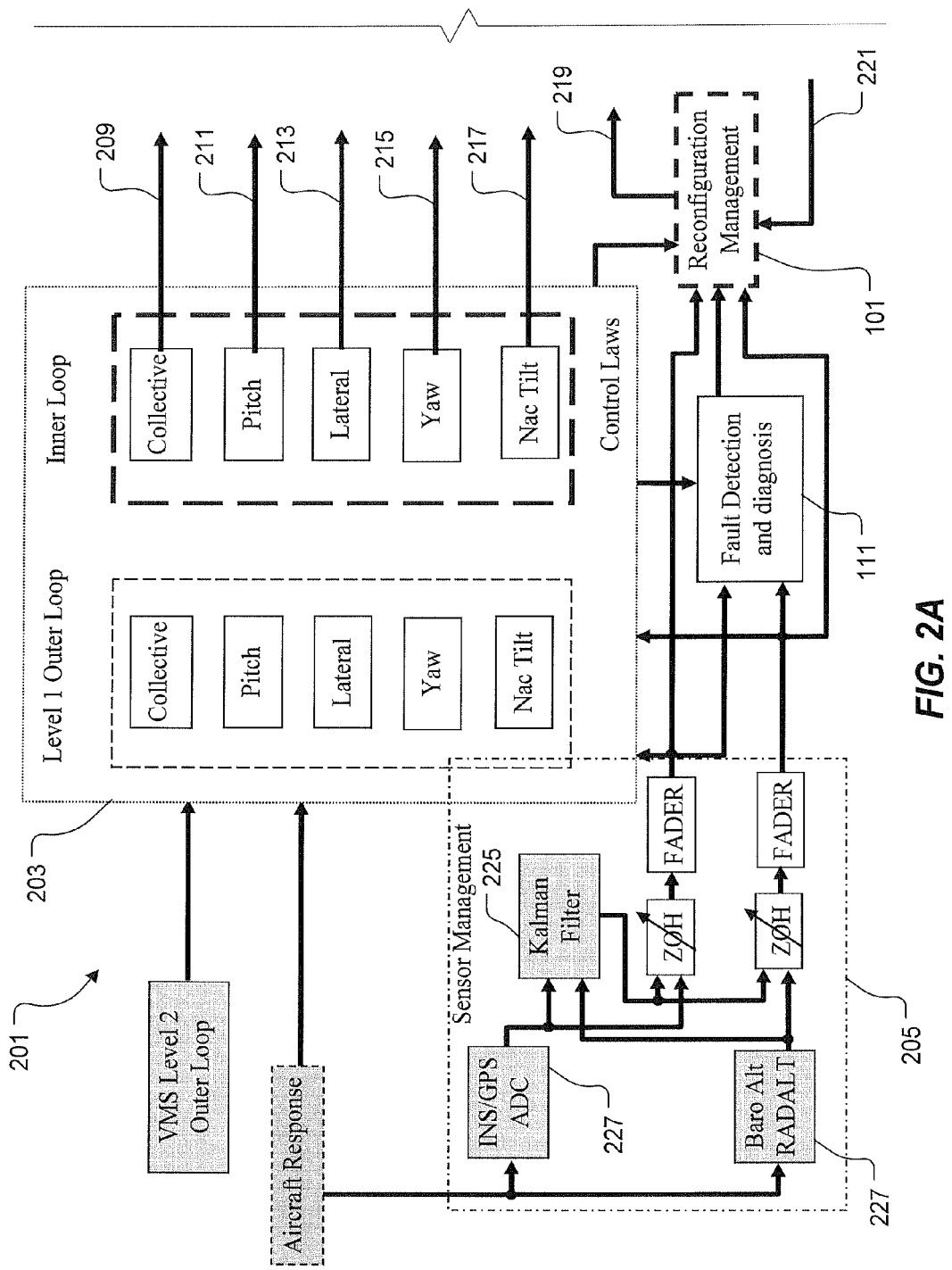
FIGS. 2A and 2B represent a continuous schematic of reconfigurable flight control system according the preferred embodiment of the present application.
Figure 2B:
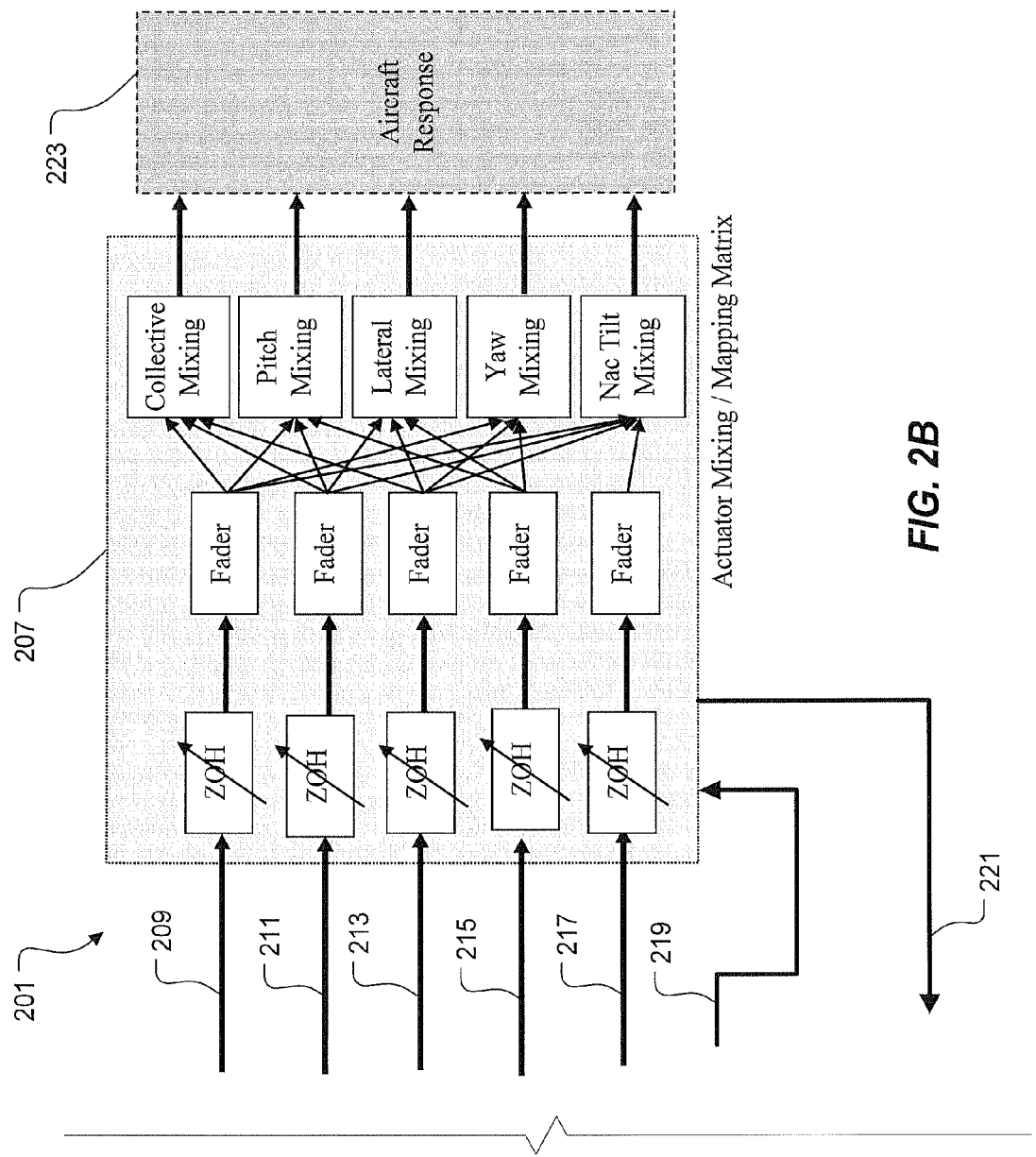

One aspect of the present application is the use of a reconfiguration management tool 101 in order to dictate reconfiguration of flight controls law in a reconfigurable flight control system 201. FIG. 1 represents a schematic of reconfiguration management tool 101. FIGS. 2A and 2B represent a schematic of reconfigurable flight control system 201 which utilizes reconfiguration management tool 101.

Referring to FIG. 1, reconfiguration management tool 101 is configured for determining whether reconfiguration is necessary based upon at least a quantity of failures. In the preferred embodiment, a "no failure" event 103 requires no reconfiguration. It should be appreciated that the term failure may be at least an actuator failure or a sensor failure. In addition, other situations on the aircraft, other than an actuator or sensor failure, may produce failure type scenarios which could trigger fault/fail detection and prompt reconfiguration of the flight control laws. In the preferred embodiment, a singe failure event 105 will not trigger reconfiguration of flight control laws because a single failure event 105 should not degrade the flight control authority of the aircraft enough to warrant reconfiguration. However, in some embodiments the aircraft flight controls may be such that a single failure event 105 would in fact degrade the flight control authority enough to warrant reconfiguration. In order for the system to automatically decide whether reconfiguration is necessary, a risk factor calculation tool 121 is employed. Risk factor calculation tool 121 is discussed in further detail in connection with FIG. 3. It should be appreciated that a fault/failure detection tool 111 is used to detect sensor/actuator failure on the aircraft. Fault/Failure detection tool 111 may be incorporated into reconfiguration management tool 101, or segregated out of reconfiguration management tool, as shown in FIGS. 2A and 2B. A validation/verification tool 113 is also used to verify and backup the readings from fault/failure detection tool 111. In the preferred embodiment, detection of a multiple failure event 107 by fault/failure detection tool 111 warrants reconfiguration of flight controls in order to regain control authority. A selection event 109 involves the operation of actuators, as desired from actuator look-up table 117. A symmetric control actuator arrangement 115 is may also be used to position a symmetric actuator in the same position as the failed actuator, which is discussed in further detail herein. Control gain set changes tool 119, in conjunction with a fader system, is uniquely employed to smooth the reconfiguration process, which is also discussed further herein.

Now referring to FIGS. 2A-2B, illustrated is a continuous schematic of reconfigurable flight control system 201. Reconfiguration management tool 101 is incorporated into reconfigurable flight control system 201. Fault/failure detection tool 111 is shown in relationship with other functions within reconfigurable flight control system 201. Control Laws 203 are used to provide flight control inputs to an actuator mixing/mapping matrix 207. Control laws 203 are a software-implemented tool for controlling actuators 401 and in turn, the flight of aircraft 403. Line 209 represents a power actuator command from control laws 203 to actuator mixing/mapping matrix 207 in order to produce an aircraft response 223. Similarly, line 211 represents a pitch actuator command, line 213 represents a roll actuator command, line 215 represents a yaw actuator command, and line 217 represents a nacelle tilt actuator command. Line 219 represents an input from reconfiguration management tool 101 to actuator mixing/mapping matrix 207. Line 221 represents an input from actuator mixing/mapping matrix 207 to reconfiguration management tool 101. A sensor management tool 205 is configured to function with a Kalman filter 225 in conjunction with aircraft sensors 227 in order to allow for aircraft response to be measured by fault detection and diagnosis tool 111. Unique advantages of reconfigurable flight control system 201 will become more evident as further discussed herein. Sensor management tool 205 provides input to reconfiguration management tool 101 in order to smooth any transient conditions that may otherwise occur during reconfiguration.

Figure 3:
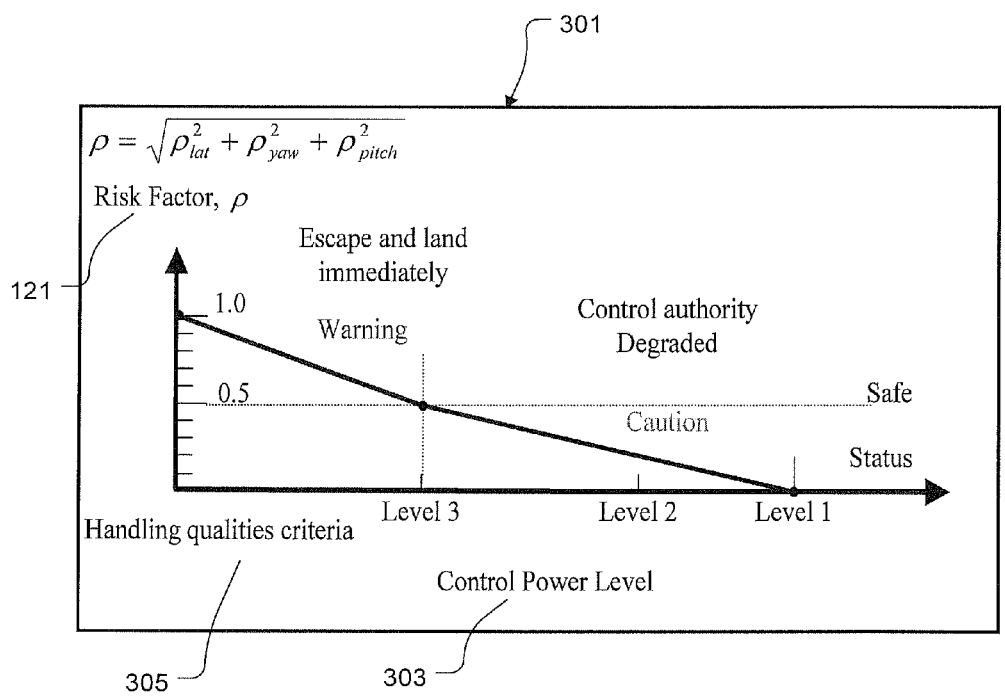
FIG. 3 is a graphical representation of risk factor versus control power level.

FIG. 3 represents a graph 301 with risk factor 121 as a function of control power level 303, which is an empirical representation of a control authority of the aircraft. Risk factor 121 ($\rho$) is one of the key elements in determination whether reconfiguration is necessary. Risk factor ($\rho$) is based upon a handling qualities criteria 305 degrading from Level I to Level III based on ADS-33-D-PRF in helicopter mode or MIL-F-8785C in "airplane mode." Calculation of risk factor 121 ($\rho$) is also based upon the control power of individual aircraft control axis. For example, in "airplane mode", an outside panel or flap of left wing will affect the flight control power in two axes. One axis is the lateral function and the other axis is the longitudinal function. During the control power calculation, this panel will not drop the system out of Level I in lateral function in any airspeed mode. Therefore, risk factor 121 in lateral function is zero. Similarly, the risk factor 121 for each axis is determined and the total risk factor 121 can be represented by the following equation:

$$\rho = \sqrt{\rho_{lat}^2 + \rho_{yaw}^2 + \rho_{pitch}^2}$$

Calculation of risk factor 121 is based upon individual axes of individual aircraft actuators. The maximum risk factor value of each axis is 1, which means that the axis in question is 100% not recoverable. Based on individual actuators contributing to the total control authority of the axis, the value of the risk factor 121 ($\rho$) starts increasing when the total control authority drops below Level I requirement. The control authority on each axis for any airspeed is preferably pre-calculated and treated as a knowledge base in the software program. Calculation of risk factor 121 is preferably restlessly running when reconfiguration management tool 101 is operating.

Figure 4:
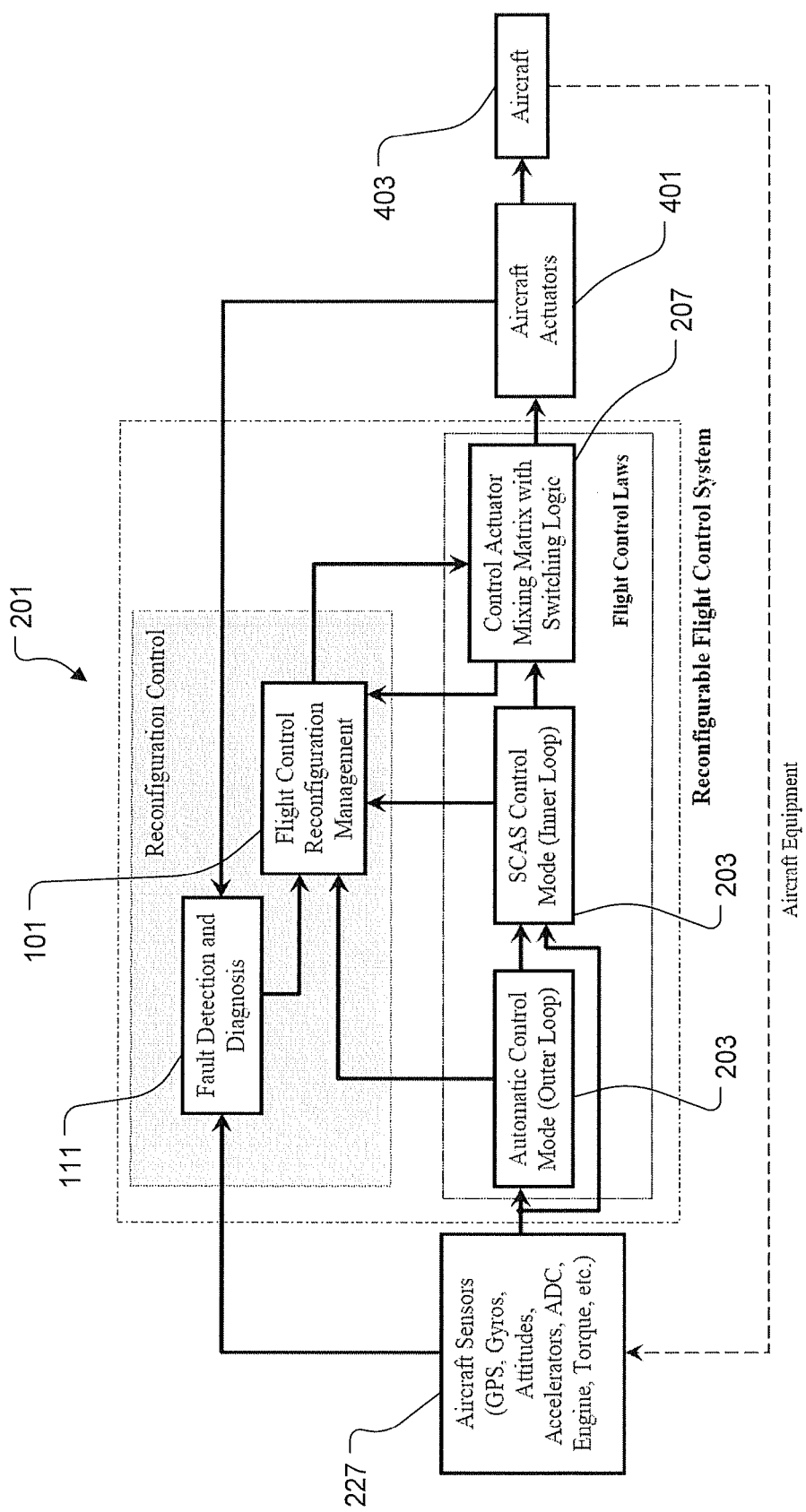
FIG. 4 is a schematic representation of reconfigurable flight control system.
Figure 20:
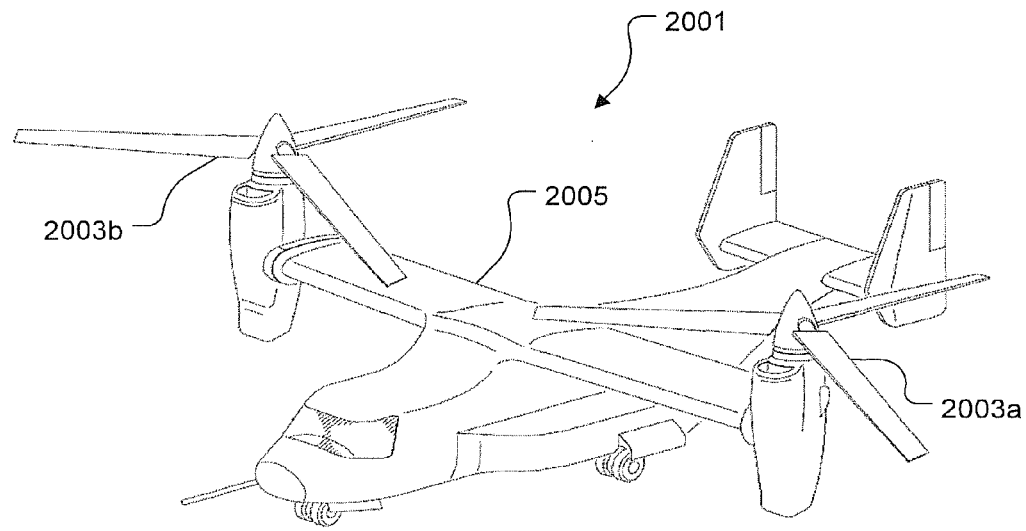
FIG. 20 is a perspective view of a conventional tiltrotor according to an alternative embodiment.

Referring to FIG. 4, which is another graphical schematic of reconfigurable flight control system 201. Aircraft 403 has aircraft actuators 401 and aircraft sensors 103. For purposes of providing an exemplary application of reconfigurable flight control system 201, aircraft 403 is represented as a quad tilt rotor 501. It should be fully appreciated that reconfigurable flight control system 201 may be fully implemented on aircraft 403 other than quad tilt rotor 501. For example, FIG. 20 illustrates a conventional tiltrotor 2001 which may employ reconfigurable flight control system 201. Other aircraft, including tandem rotorcraft, and even conventional rotorcraft with can benefit from the system of the present application.

Figure 5:
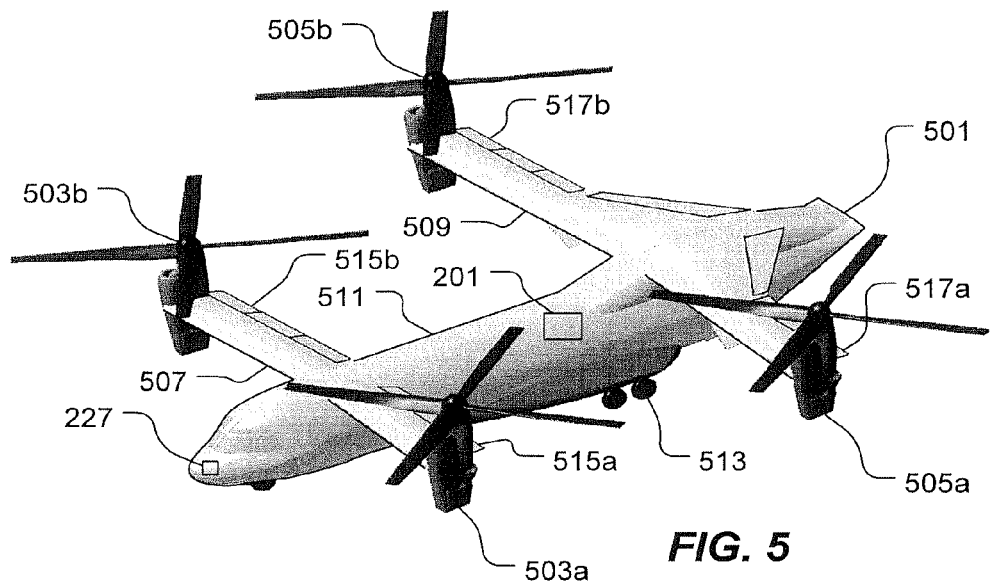
FIG. 5 is a perspective view of the quad tilt rotor aircraft, while in airplane mode, having the reconfigurable flight control system according the preferred embodiment of the present application.
Figure 6:
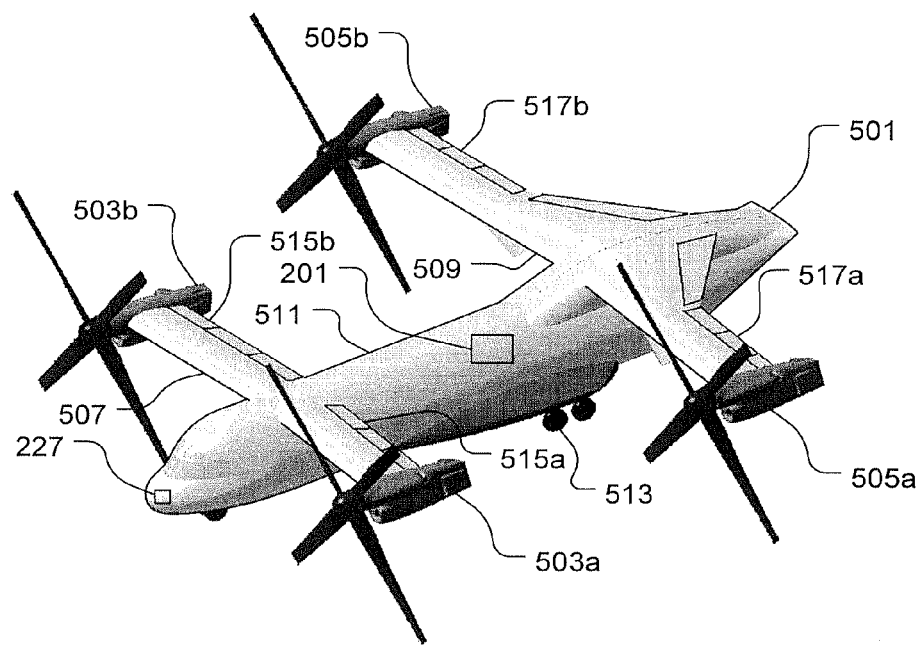
FIG. 6 is a perspective view of the quad tilt rotor aircraft, while in airplane mode, having the reconfigurable flight control system according the preferred embodiment of the present application.

Referring now to FIGS. 5 and 6, Quad tilt rotor 501 is depicted having a first and a second rotatable rotor 503a and 503b on a forward wing 507 and a third and a fourth rotatable rotor 505a and 505b on an aft wing 509. Additionally, quad tilt rotor 501 has a fuselage 511 and a landing gear 513. FIG. 5 illustrates quad tilt rotor 501 in a "helicopter mode", in which rotors 503a, 503b, 505a, and 505b are directed approximately 90 degrees, or in an otherwise predominately vertical position. FIG. 6 illustrates quad tilt rotor 501 in an "airplane mode", in which rotors 503a, 503b, 505a, and 505b are directed at approximately 0 degrees, or in an otherwise predominately horizontal position. Flight control features of quad tilt rotor 501 will be discussed further herein with regards to reconfigurable flight control system 201. It should be fully appreciated the system of the present application may be fully implemented on aircraft 403 other than quad tilt rotor 501.

Aircraft Sensors:

Aircraft sensors 227 are used in part to provide input to reconfiguration management tool 101 and fault/failure detection tool 111. Sensor values and statuses from aircraft sensors 227 also provide input to fault detection and diagnosis tool 105. Examples of aircraft sensors 227 include: global positions satellite systems (GPS), Inertial Navigations Systems (INS), gyros, attitude sensors, accelerometers, pressure sensors, air data computers (ADC), engine sensors, and rotor torque sensors, to name a few. Multiple sensors 227 may be used to provide redundancy in case a primary sensor 227 malfunctions. Though aircraft sensors 227 are depicted as a symbolic box in FIGS. 5 and 6, it should be appreciated that sensors 227 are preferably deployed throughout aircraft 403 so as to best take measurements and provide data.

Aircraft Actuators:

Aircraft actuators 401 will be described herein in the context of quad tilt rotor 501; however, it should be appreciated that the discussion herein regarding aircraft actuators 401 is applicable to an aircraft with features similar and different than that of quad tilt rotor 501, such as conventional tilt rotor aircraft 2001 shown in FIG. 20. For purposes of this discussion, aircraft actuators 401 should be interpreted generally to be any control surface, wing, engine, rotor, swashplate, flap, etc, that can contribute and dictate the flight path of aircraft 403. Each rotor 503*a*, 503*b*, 505*a*, and 505*b*, has a swashplate (not shown) for producing a collective input, a lateral flapping input, and a forward/aft (F/A) flapping input. As previously mentioned, each rotor 503*a*, 503*b*, 505*a*, and 505*b*, is capable of rotating between a "helicopter mode", wherein the rotors is generally vertical, and an "airplane mode", in which the rotors are generally horizontal. Additionally, quad tilt rotor 501 has control surfaces, such as wings 507 and 509 and flaps 515*a*, 515*b*, 517*a*, and 517*b*. FIGS. 4A-4C represent a chart 401 listing of exemplary actuators 401 on quad tilt rotor 501. Actuators 401 that are non-moveable, such as the non-moveable portions of wings 507 and 509, are identified as N/A (non-actuatable) in FIGS. 7A-7C.

In general, "helicopter mode" of quad tilt rotor 501 is when quad tilt rotor 501 has its rotors 503*a*, 503*b*, 505*a*, and 505*b* at an angle between 80 and 90 degrees, while flying at airspeeds less than 80 knots, and a wing flap setting higher than 40 degrees. In general, "airplane mode" of quad tilt rotor 501 is when quad tilt rotor 501 has its rotors 503*a*, 503*b*, 505*a*, and 505*b* at an angle of approximately 0 degrees while flying at airspeeds greater than 200 knots. "Conversion mode" of quad tilt rotor 501 is any flight mode between "helicopter mode" and "airplane mode". FIG. 8 illustrates a graph 801 showing the relationship between "helicopter mode", "airplane mode", and "conversion mode" as a function of rotor tilt angle and airspeed.

FIGS. 9-14 illustrate aerodynamic effects of operating certain actuators 401 of quad tilt rotor 501, while in "helicopter mode" and "airplane mode". It should first be noted that the quad tilt rotor 501 has the capability to differentiate collective power (DCP) so as to operate collective pitch the rotor blades of one rotor more or less than any other rotor so as to produce a desired reactionary force upon quad tilt rotor 501.

Figure 9:
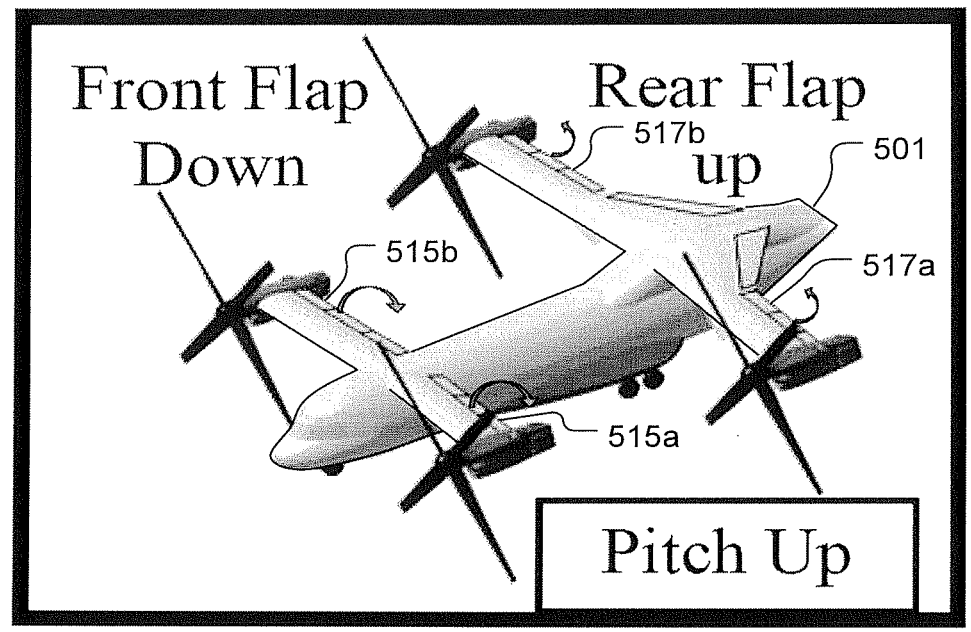
FIG. 9 is a perspective view of the quad tilt rotor aircraft, while in airplane mode, with a pitch up control axis.

FIG. 9 illustrates a pitching up control axis of quad tilt rotor 501 while in "airplane mode." Forward flaps 515*a* and 515*b* are actuated down, while aft flaps 517*a* and 517*b* are actuated up, thereby producing a pitching up control axis of quad tilt rotor 501 while in airplane mode. It should be appreciated that flaps 515*a*, 515*b*, 517*a*, and 517*b* are each comprised of multiple flaps, each individual flap being capable of being actuated individually or in conjunction with other flaps.

Figure 10:
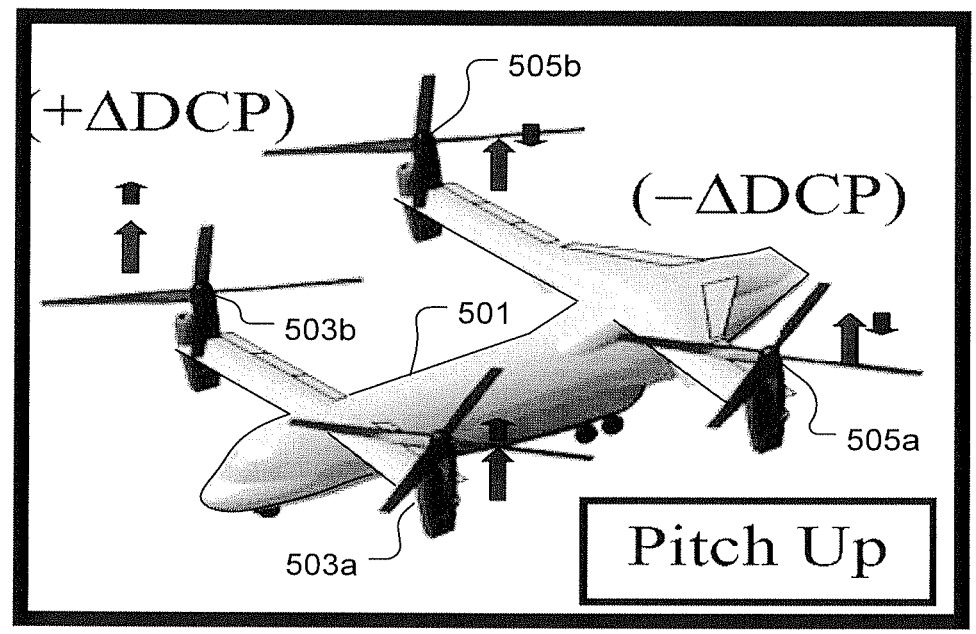
FIG. 10 is a perspective view of the quad tilt rotor aircraft, while in helicopter mode, with a pitch up control axis.

FIG. 10 illustrates a pitching up control axis of quad tilt rotor 501 employing differentiate collective power (DCP) while in "helicopter mode." Swashplate actuators within rotors 503*a*, 503*b*, 505*a*, and 505*b* are actuated so as to produce a higher amount of thrust in the forward rotors 503*a* and 503*b* than within the aft rotors 505*a* and 505*b*, thereby producing a pitching up result of quad tilt rotor 501 while in "helicopter mode."

Figure 11:
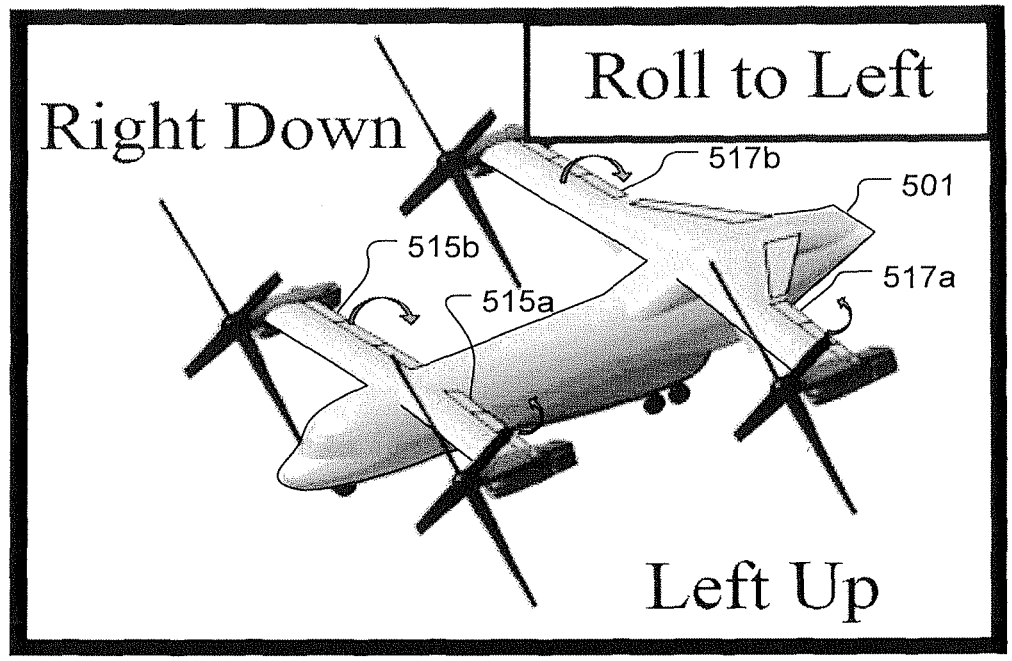
FIG. 11 is a perspective view of the quad tilt rotor aircraft, while in airplane mode, with a roll left control axis.

FIG. 11 illustrates a rolling control axis of quad tilt rotor 501 while in "airplane mode." Left flaps 515*a* and 517*a* are actuated up, while right flaps 515*b* and 517*b* are actuated down, thereby producing a left roll of quad tilt rotor 501 while in "airplane mode." Similarly, left flaps 515*a* and 517*a* can be actuated down, while right flaps 515*b* and 517*b* are actuated up, thereby producing a right roll of quad tilt rotor 501 while in "airplane mode."

Figure 12:
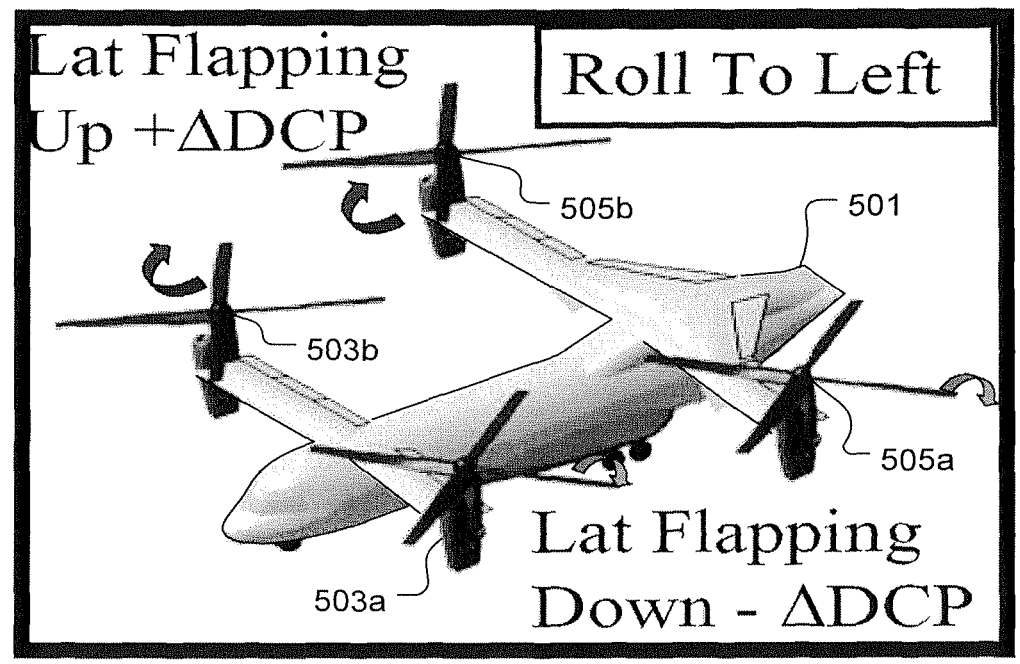
FIG. 12 is a perspective view of the quad tilt rotor aircraft, while in helicopter mode, with a roll left control axis.

FIG. 12 illustrates a rolling control axis of quad tilt rotor 501 employing differentiate collective power (DCP) and lateral flapping, while in "helicopter mode." Swashplate actuators within rotors 503*a*, 503*b*, 505*a*, and 505*b* are actuated so as to produce a higher amount of thrust in right rotors 503*b* and 505*b* than within left rotors 503*a* and 505*a*, thereby producing a roll left of quad tilt rotor 501 while in "helicopter mode." In order to supplement the roll left produced by employing DCP, swashplate actuators within right rotors 503*b* and 505*b* produce a cyclic lateral flapping upward, while swashplate actuators in left rotors 503*a* and 505*a* produce a cyclic lateral flapping downward. Similarly, a roll to the right can be produced by performing the opposite functions that were used to achieve a roll to the left.

Figure 13:
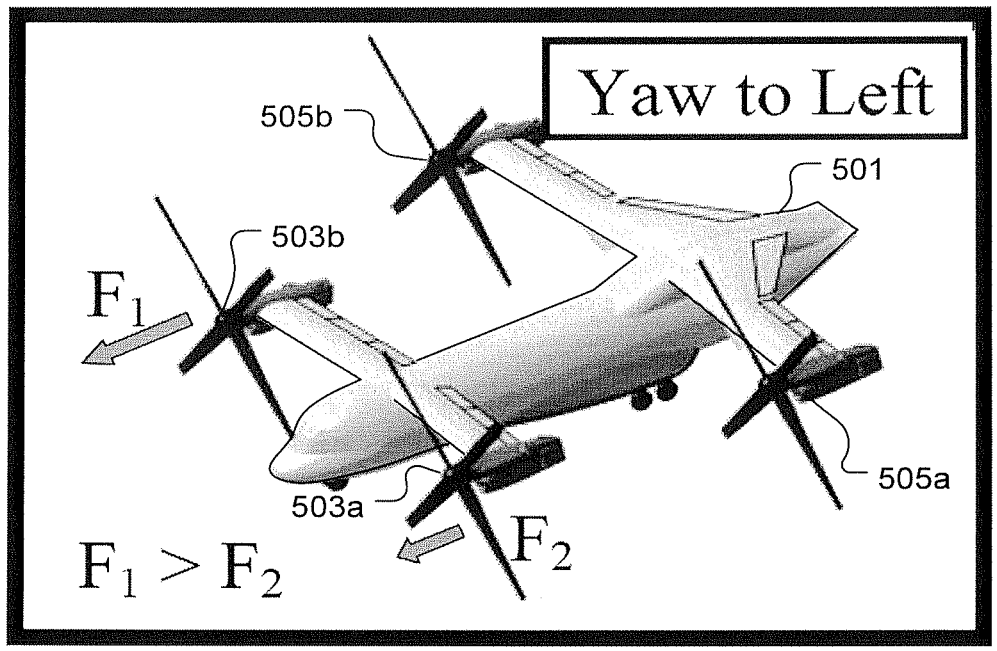
FIG. 13 is a perspective view of the quad tilt rotor aircraft, while in airplane mode, with a yaw left control axis.

FIG. 13 illustrates a yawing control axis by employing differentiate collective power (DCP), while quad tilt rotor 501 is in "airplane mode." Swashplate actuators within rotors 503*a*, 503*b*, 505*a*, and 505*b* are actuated so as to produce a higher amount of thrust in the right rotors 503*b* and 505*b* than within the left rotors 503*a* and 505*a*, thereby producing a yaw left of quad tilt rotor 501 while in "airplane mode." Similarly, swashplate actuators within rotors 503*a*, 503*b*, 505*a*, and 505*b* can be actuated so as to produce a higher amount of thrust in the left rotors 503*a* and 505*a* than within the right rotors 505*b* and 505*b*, thereby producing a yaw right of quad tilt rotor 501 while in "airplane mode."

Figure 14:
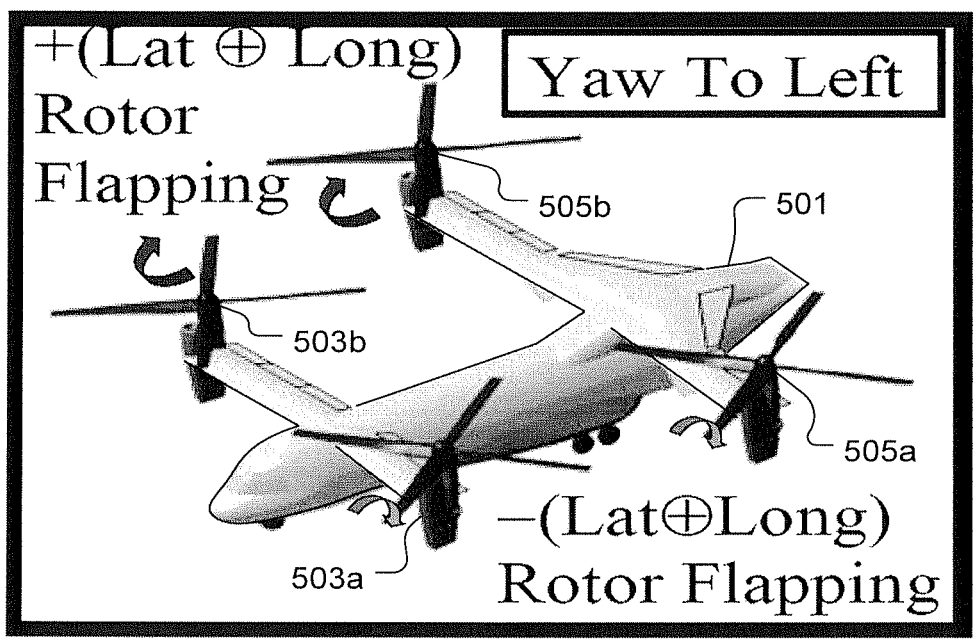
FIG. 14 is a perspective view of the quad tilt rotor aircraft, while in helicopter mode, with a yaw left control axis.
Figure 17:
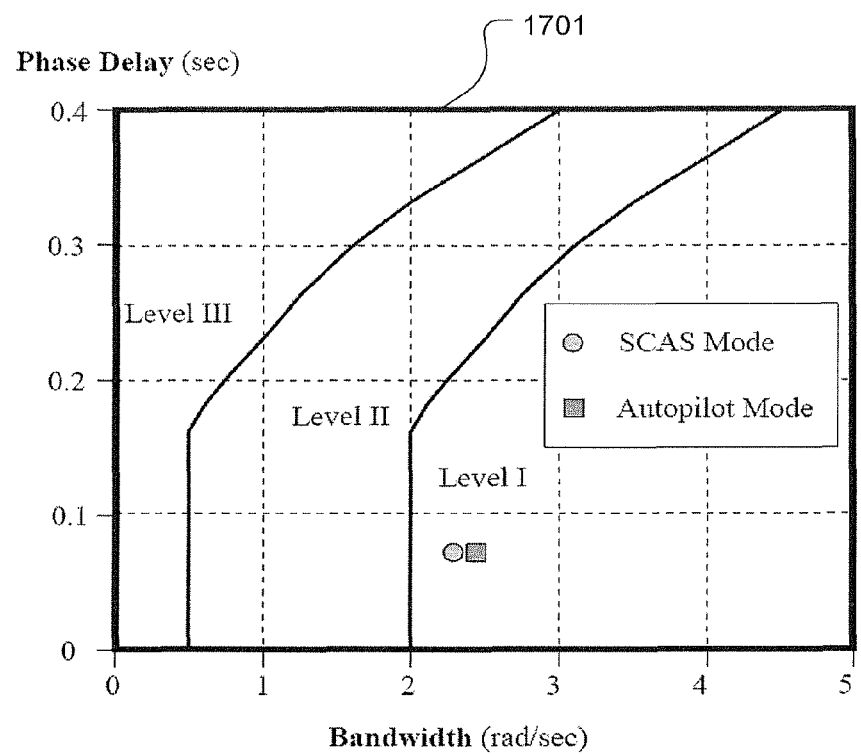
FIG. 17 is a graphical representation of SCAS mode and autopilot (Automatic control) mode as a function of bandwidth and phase delay.

FIG. 14 illustrates a yawing control axis by employing cyclic lateral and longitudinal flapping, while quad tilt rotor 501 is in "helicopter mode." Swashplate actuators within the right rotors 503*b* and 505*b* produce a cyclic lateral flapping upward and a forward longitudinal flapping, while swashplate actuators in left rotors 503*a* and 505*a* produce a cyclic lateral flapping downward and a reverse longitudinal flapping in order to produce a yaw to the left while quad tilt rotor 501 is in "helicopter mode." Similarly, a yaw to the right can be produced by performing the opposite functions that were used to achieve a yaw to the left.

Primary controls of quad tilt rotor 501 in "helicopter mode" are summarized in a chart 1501 in FIG. 15. With the exception of vertical control from rotor collective responses, all other three axis (pitch, roll, and yaw) having redundancy from either DCP or rotor flapping of F/A (forward/aft) axis or lateral axis. It should be noted that it is desired to use differential nacelle tilt angles to offset yawing moments in the event of a failure condition. It is not desirable to use differential nacelle tilt angle as a primary control because the response time of rotating the nacelles is too slow. As such, the use of differential nacelle tilt angles for controlling yaw moments is reserved as a redundant/reserve control in actuator mixing/mapping matrix 207 of reconfigurable flight control system 201. Similarly, primary controls of quad tilt rotor 501 in "airplane mode" are summarized in chart 1601 of FIG. 16. Forward speed in "airplane mode" is controlled by a throttle setting. It should also be noted that RPM of the rotors is reduced from approximately 397 to 333 before the rotors reach airplane mode position.

Aircraft Redundancies:

Redundancies in the control axis (pitch, roll, and yaw) of quad tilt rotor 501 in helicopter mode allow for greater variety in reconfiguration of flight control laws 203. The variety of usable flight control laws can better appreciated when comparing quad tilt rotor 501 to the flight control system for general rotorcraft. In regards to flight control laws for helicopter mode, because quad tilt rotor 501 has rotors 503a, 503b, 505a, and 505b with cyclic capabilities, then quad tilt rotor 501 can fly using typical helicopter flight control laws when in low airspeed "helicopter mode." Quad tilt rotor 501 can also use helicopter flight control laws indicative of a tandem rotorcraft. A typical tandem rotorcraft has a fuselage with a front rotor and a rear rotor, both rotors being mounted to the fuselage. The rotors on a tandem rotorcraft are considered to be of the same power set in the flight control laws. Quad tilt rotor 501 can also use helicopter flight control laws indicative of a conventional tiltrotor aircraft, such as conventional tiltrotor aircraft 2001 having two articulated rotors 2003a and 2003b on each end of a wing 2005, as shown in FIG. 20. As such, the helicopter mode flight control laws can be indicative of a conventional helicopter, a tandem rotorcraft, a conventional tiltrotor aircraft, or any combination of the three. Additionally, the aforementioned helicopter flight control laws can be used during the transition mode between "helicopter mode" and "airplane mode." Reconfigurable flight control system 201 of the present application utilizes a combination of conventional tiltrotor flight control laws and tandem rotorcraft flight control laws for flight control laws 203. Flight control laws 203 utilize control actuator contribution from one set of primary main control surfaces as a dominator and reserves redundant or secondary main control surfaces for balance and reconfiguration. If the primary or dominator main control fails, flight control laws 203 is automatically reconfigured by reconfiguration management tool 201 so as to employ the use of redundant control actuators.

Redundancies in the control axis (pitch, roll, and yaw) of quad tilt rotor 501 in "airplane mode" allow for greater variety in reconfiguration of flight control laws. For example, because yaw control in airplane mode is controlled by DCP of left and right rotors, then yaw can be achieve by a thrust difference between the left and right sides. Since there are four rotors, there are four redundancies in regard to controlling quad tilt rotor 109 in the yaw control axis. Pitch control (or elevation) of quad tilt rotor 501 can be obtained by the difference between front wing flaps 515a and 515b, and aft wing flaps 517a and 517b. As such, there are number of ways to achieve such a difference, one method being to actuate front wing flaps 515a and 515b in the opposite direction of the actuation of aft wing flaps 517a and 517b. Another method is to fix front wing flaps 515a and 515b while actuating aft wing flaps 517a and 517b in order to generate an elevation change. Another method is to fix aft wing flaps 517a and 517b, while actuating the front wing flaps 213a and 213b in order to generate an elevation change. Additionally, each set of flaps 515a, 515b, 517a, and 517b, are actually comprised of three or more small panels, each small panel being independently subject to actuation. As such, there are at least three redundancies regarding pitch axis control of quad tilt rotor 501 in "airplane mode." Roll control of quad tilt rotor 501 can be obtained by the difference between left wing flaps 515a and 517a, and right wing flaps 515b and 517b. Another method is to fix the left flaps 515a and 217a, while actuating the right wing flaps 515b and 517b. Similarly, another method is to fix the right wing flaps 515b and 517b, while actuating the left wing flaps 515a and 517a. Additionally, each set of flaps 515a, 515b, 517a, and 517b, are actually comprised of three or more small panels, each small panel being independently subject to actuation. As such, there are at least three redundancies regarding yaw axis control of quad tilt rotor 501 in "airplane mode." In order for reconfigurable flight control system 201 to be robust, it must take advantage all of the available aforementioned redundancies, as well as take into account all types of possible failures.

Uncertainties:

Robustness of is achieved in reconfigurable flight control system 201 in part by consideration of a multitude of uncertainties within the aircraft model. Such uncertainties typically include aerodynamics with more than five sources, such as: 1) fuselage/empennage/anti-torque/stabilizer interactions, 2) control actuator delays/couplings/fault or failure, 3) sensor management error/fault or battle damage, 4) estimation of incompressible drag (I/D) coefficient, and 5) outside wind effect.

With regards to sensor failure protection and disturbance attenuation, a Kalman filter 225 within sensor management tool 205 is utilized so that a single sensor failure in the aircraft will not cause any flight quality difference. In addition, Kalman filter provides only a slight downgrade in flight performance if multiple sensors were to fail. One objective in using passive actuator failure protection through the use of Kalman filter 225 is to reduce sensitivities from uncertainties. Another objective is to associate Kalman filter 225 with minimum available sensors in order to estimate full state variables so that sensor failure mode can be protected. In such a manner, Kalman filter 225 interprets data from flight control sensors on the aircraft. Kalman filter 225 and control laws 203 consider fundamental sources of 1) aerodynamics of the aircraft, 2) flight mechanics of the aircraft, 3) control power coefficient changes due to aerodynamics, 4) center of gravity shifting, 5) wind disturbances, and 6) aerodynamic ground effect and building effect (from urban flight). Robust control laws 203 and estimations are employed to achieve certain objectives. A first objective is that robust control laws and estimations automatically compute all phase margins and gain margins on any speeds to help consolidate the control laws. A second objective is to ensure the efficiency of control input during the entire flight envelope using a minimum energy function/maximum performance requirement. A third objective is to help reduction of the disturbance affections from aerodynamic interaction by aircraft structures and controls. A fourth objective is to reduce the noise level of the aircraft by ensuring the control amplitudes are small during maneuvers. A fifth objective is to allow the pilot to stabilize the aircraft in the event of multiple sensors failing. A sixth objective is for the stabilization of SCAS control mode (inner loop), which is inherently not stable. A seventh objective is to make the aircraft as robust as possible so that any sudden wind changes will not affect flight characteristics. An eighth objective is to prevent the need for logic switches in the cockpit in order to avoid confusion and simplify flight switch logic design. A ninth objective is to prevent changes in aircraft gross weight and center of gravity from affecting the flight characteristics.

Reconfiguration During an Aircraft Maneuver:

One purpose of the system of the present application is to robustly construct reconfiguration control system 201 so as to minimize negative results of reconfiguration during a maneuver of quad tilt rotor 501. Undesirable transient conditions may occur when the aircraft actuators 401 are repositioned during reconfiguration. Transient conditions may be harmful to aircraft 403 and to occupants of aircraft 403. Reconfigurable control system 201 acts to limit the occurrence of transients, which are harmful rapid changes in actuators 401 resulting sudden flight disturbances. Transients may induce the saturation of amplitude and/or rate limits in aircraft actuators 401 as well as damage aircraft system components. As such, there exists considerable motivation to limit and manage an occurrence of a transient situation. One challenge in management of transient situations is in the management of actuators for different conditions when actuators 401 have multiple input/output systems. Identifiable conditions of actuators 401 are: 1) a fault free period, 2) a transient period during reconfiguration, 3) reconfiguration during a maneuver mode, and 4) steady state flight after reconfiguration. When an actuator 401 fails, such as a flap 515a, actuator 401 can either remain at its failed position or retract back to its neutral position. Control position sensors 227 are configured to detect whether the actuator 401 was able to retract back to its neutral position or whether actuator 401 remained at its failed position.

Figure 18:
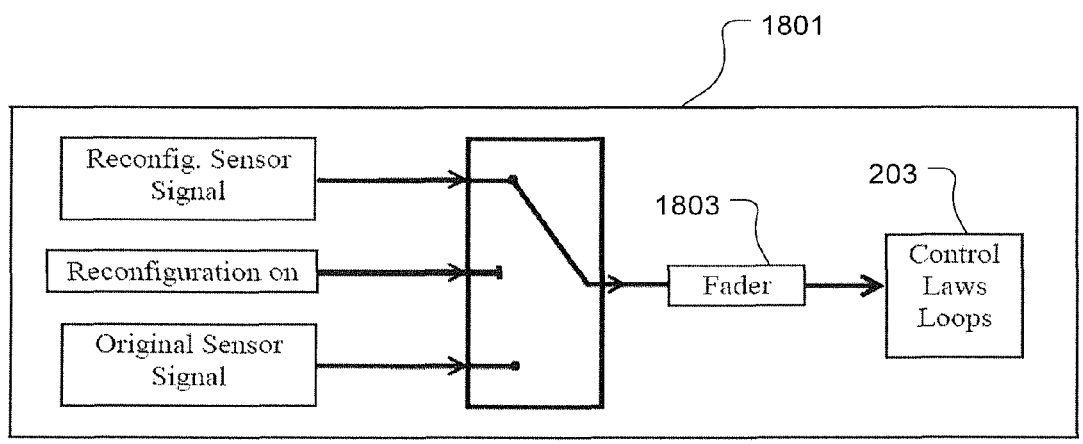
FIG. 18 is a schematic representation of the use of a fader in conjunction with flight control laws.
Figure 19:
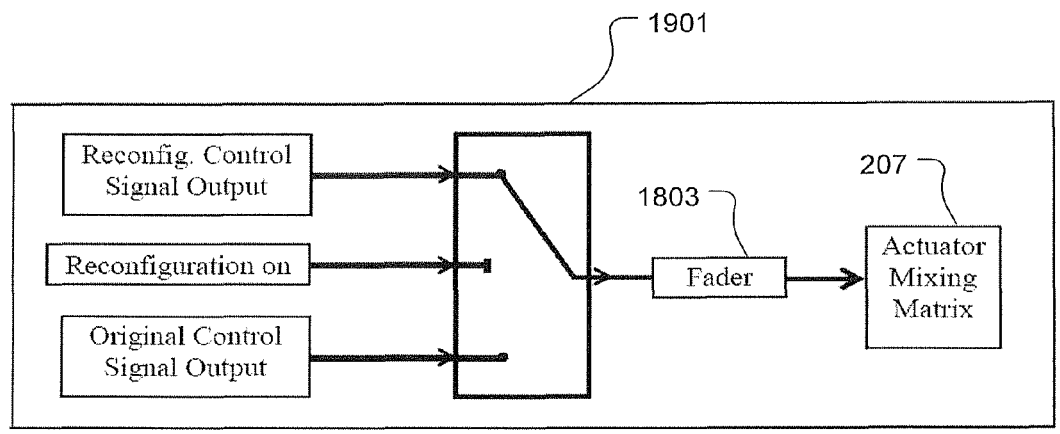
FIG. 19 is a schematic representation of the use of a fader in conjunction with a mixing/mapping matrix.

Referring to FIG. 18, in schematic 1801, input and output fading methods are represented as fader 1803. As discussed herein, fader 1803 is used to reduce harmful transients during reconfiguration. Input cross-fading methods involve introducing fade block installation in front of the input side; as such, when reconfiguration starts, the input from feedback will be slowly incremented in order to avoid higher amplitude feedback from the input side. Output cross-fading methods involves introducing fade block installation on the output side of the actuator; as such, when reconfiguration starts, the output signal will start from its original value and slowly convert failed actuators to new reconfiguration actuators.

Symmetric Control Surface Arrangement:

In addition to the use of input and output cross-fading methods, symmetric control surface arrangement technique is hereby introduced. Quad tilt rotor 501 has symmetric actuators 401 between the left and right sides, as well symmetric actuators 401 on forward and aft portions of the aircraft. As such, symmetric control surface arrangement is hereby presented. A primary focus of symmetric control surface arrangement is to detect the failed actuator and actuate a symmetrically opposite non-failed actuator in the same position as the failed actuator in order to provide aerodynamic stability to the quad tilt rotor 501. This seamless reconfiguration of actuators 401 can be described as a "trim" and "sync" process. The "trimming" of the actuators is the symmetric balancing of the positions of the actuators 401 together for lateral and longitudinal control balancing. The "syncing" of the actuators is the locking of the actuators 401 in their "trimmed" positions. This symmetric control surface arrangement is preferably located within reconfiguration management tool 101, shown in FIG. 1. It should be appreciated that symmetric control surface arrangement acts to limit and manage an occurrence of a transient situation, as well as provide an efficient means for reconfiguring control laws 203.

Control Actuator Mixing/Mapping Matrix:

Control actuator mixing/mapping matrix 207, shown in FIG. 2B, can take several forms. One objective of control actuator mixing/mapping matrix 207 is to safely transfer authority from any failed actuators 401 to back-up actuators 401 during reconfiguring while reducing the possibility of a large reconfiguration transient. As shown in FIG. 20, schematic 2001 illustrates how output fader 1803 is employed to achieve reconfiguration transient reduction.

When it has been determined that reconfiguration is necessary, then an account of the healthy actuators is necessary. Management of these healthy actuators that can be employed for reconfiguration is managed by a set of mapping rules. These mapping rules then become logical management software design so as to determine a set of mapping routes that can be used when a set of particular actuator or component failure occurs.

For example, if one or more actuators failed and it was determined that reconfiguration was necessary, control actuator mixing/mapping matrix 207 provides that capability to first mix the usage of actuators. An example of mixing actuators would be to control lateral axis of the aircraft using 80% DCP and 20% flaps. The mapping function within control actuator mixing/mapping matrix 207 provides the capability to continuously re-map or change the percentages of the actuators being used, such as using 85% DCP and 15% flaps in order to provide a lateral control axis for the aircraft. As shown in FIG. 2B, control actuator mixing/mapping matrix 207 provides collective mixing, pitch mixing, lateral mixing, yaw mixing, and nacelle (rotor) tilt mixing. Control actuator mixing/mapping matrix 207 also uses a fader in the mixing process in order to smooth transients, or any destabilization in flight control due to a jump in actuator reconfiguration.

It is also preferable to predetermine the events that will trigger a need for reconfiguration. Predetermination of this triggering event is achieved by an infinity state flow technique to switch the necessary protection for reconfiguration design. Timing, delay, and reconfirming the event can all be included in this infinity state flow logic.

Additionally, a selection of an appropriate new and healthy actuator 401 occurs when each triggering event occurs. Precalculation of the appropriate healthy actuator 401 for each triggering event shall be carefully predetermined. It shall be insured that after transforming to new actuator set, the performance of aircraft 501 shall maintain reliability and safety in flight. The control power authority related to risk factor or degraded ratio is employed to minimize the risk of reconfiguring the flight controls.

Lastly, employment of control actuator mixing/mapping matrix 207 is used to make reconfiguration successful and safe. Each step, from integration of the trigger event to the mapping of the new actuator set, is interpreted with caution. At the final mapping step, the healthy actuators will remain unchanged. The new actuator movement will preferably start from its current trim point and all actuators will reach there desired position, either laterally or longitudinally.

Safety, Reliability, and Re-Configurability Analysis and Assessment:

The primary objective for introducing redundancy and fault tolerance is to increase the reliability and safety of a controlled system. Safety is the ability of a system to keep from causing danger to human life, equipment or environment. Reliability is the ability of a system or component to perform a required function correctly over a given period of time under a given set of fault conditions. Control re-configurability assesses the system ability to allow performance restoration in the presence of faults. By exploiting analytical redundancy and applying fault diagnosis and fault-tolerant control techniques, the primary objective is to introduce a way to increase a system's safety and reliability.

The system of the present application provides many significant advantages over non-reconfigurable flight control system. Occurrence of a failure situation on aircraft is potentially catastrophic; however, a reconfigurable flight control system acts to reduce a pilot's burdens by reducing the pilot's responsibilities while allowing the pilot to maintain their flight skill so as to bring the aircraft home safely. This functionality acts to save lives and aircraft.

The system of the present application provides significant advantages, including: (1) providing individual axis flight control technology; (2) using a combination of tandem and conventional tilt-rotor flight control laws; (3) using gain scheduling to achieve Handling Qualities Level I; (4) providing a Kalman filter for protection against sensor failure; and (5) providing robust control to protect against uncertainties; (6) providing fault and failure detection with validation and verification; (7) providing fader function in order to make input/output switching smoother; (8) reduction of transient occurrence during reconfiguration; (9) development of symmetric control surface arrangement technique; (10) providing control authority in risk factor design; (11) providing smooth performance upon sensor or actuator failure; (12) providing multi-layer table look-up for reconfiguration with gain-rescheduling; and (13) integration of reconfigurable flight control laws of each control axis.

It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A reconfigurable flight control system for reconfiguring flight control of an aircraft in response to a failure, the aircraft having flight control actuators and sensors, the reconfigurable flight control system comprising:
   a control law that is software-implemented and configured to automatically send flight control data to a mixing/mapping matrix;
   a reconfiguration management tool configured to communicate with the mixing/mapping matrix in order to safely transfer authority from a failed actuator to a back-up actuator, the reconfiguration management tool comprising:
      a risk factor tool for calculating a risk factor, the risk factor being used for determining whether reconfiguration is necessary;
   wherein the risk factor is an empirical representation of a control authority of the aircraft, such that a degradation in the control authority effects the risk factor; and
   a sensor management tool for providing input to the reconfiguration management tool in order to smooth any transient conditions that may occur during the reconfiguring flight control of the aircraft in response to the failure;
   wherein the mixing/mapping matrix is configured to mix the usage of the flight control actuators in response to a failing of the failed actuator by employing a first independent actuator system at a first percentage and employing a second independent actuator system at a second percentage, such that the combination of the first independent actuator system and the second independent actuator system produces a desired aircraft flight control response that takes into consideration the failed actuator;
   wherein the mixing/mapping matrix is configured to continuously change the first percentage and the second percentage to optimize flight control of the aircraft in response to the failed actuator.

2. The reconfigurable flight control system according to claim 1, wherein the risk factor takes into consideration a control power level.

3. The reconfigurable flight control system according to claim 1, wherein the reconfiguration management tool further comprises:
   an authority for dictating a symmetric control actuator arrangement so as to position a non-failed actuator in a same position as a failed actuator, the non-failed actuator and the failed actuator being symmetric actuators such that symmetric positioning of the non-failed actuator and the failed actuator provides aerodynamic stability to the aircraft.

4. The reconfigurable flight control system according to claim 1, wherein the reconfiguration management tool further comprises:
   a fault/fail detection tool for detecting a failure of at least one of the flight control sensors and actuators.

5. The reconfigurable flight control system according to claim 1, wherein the reconfiguration management tool is configured for determining whether reconfiguration is necessary based upon a quantity of separate actuator failures.

6. The reconfigurable flight control system according to claim 1, wherein the sensor management tool comprises:
   a Kalman filter for interpreting a data from the flight control sensors on the aircraft.

7. The reconfigurable flight control system according to claim 1, wherein the sensor management tool is configured to interpret data from the sensors on the aircraft, and provide the interpreted data to a fault/failure detection tool and the reconfiguration management tool.

8. The reconfigurable flight control system according to claim 1, wherein the first independent actuator system uses a differentiate collective power such that a first rotor produces a higher amount of thrust than a second rotor, and wherein the second independent actuator system uses a left and right aircraft flap differential, such that the first independent actuator system and the second independent actuator system act jointly to achieve an aircraft yawing control of the aircraft.

9. The reconfigurable flight control system according to claim 1, wherein the aircraft is a quad tilt rotor.

10. The reconfigurable flight control system according to claim 1, wherein the aircraft is a tilt rotor aircraft.

11. The reconfigurable flight control system according to claim 1, wherein the smoothing any transient conditions that may occur during reconfiguration by the sensor management tool involves the employment of a fader, the fader being used to gradually convert positioning of at least one failed actuator and positioning of at least one reconfigured actuator.

12. The reconfigurable flight control system according to claim 11, wherein the fader is configured to prevent a high amplitude feedback in front of an input side by implementation of a fade block installation.

13. An aircraft comprising:
   flight control actuators;
   a fuselage having a forward wing and an aft wing;
   a first rotor rotatably attached to a left side of the forward wing;
   a second rotor rotatably attached to a right side of the forward wing;
   a third rotor rotatably attached to a left side of the aft wing;
   a fourth rotor rotatably attached to a right side of the aft wing;
   at least one left forward flap and at least one right forward flap on the forward wing;
   at least one left aft flap and at least one right aft flap on the aft wing; and
   a reconfigurable flight control system for selectively reconfiguring involvement of the first rotor, the second rotor, the third rotor, the fourth rotor, the at least one left forward flap, the at least one right forward flap, the at least one left aft flap, and the at least one right aft flap, during a failure of any of the rotors and the flaps, the reconfigurable flight control system comprising:
- a risk factor tool for calculating a risk factor, the risk factor being used for determining whether reconfiguration is necessary;
- wherein the risk factor is an empirical representation of a control authority of the aircraft, such that a degradation in the control authority effects the risk factor;
- a mixing/mapping matrix configured to mix the usage of the flight control actuators in response to the failure of any of the rotors and the flaps by employing a first independent actuator system at a first percentage and employing a second independent actuator system at a second percentage, such that the combination of the first independent actuator system and the second independent actuator system produces a desired aircraft flight control response that takes into consideration the failure of any of the rotors and the flaps;
- wherein the mixing/mapping matrix is configured to continuously change the first percentage and the second percentage to optimize flight control of the aircraft in response to the failure of any of the rotors and the flaps;
- wherein the aircraft is configured for flying in an airplane mode wherein the first, second, third, and fourth rotors are rotated to be in a generally horizontal position;
- wherein the aircraft is configured for flying in a helicopter mode wherein the first, second, third, and further rotors are rotated to be in a generally horizontal position.

14. The aircraft according to claim 13, wherein the reconfigurable flight control system is configured to generate a yawing control of the aircraft while in the airplane mode by selectively differentiating a collective power in the first, second, third, and fourth rotors, in any combination so as to produce a desired differential in thrust between the left side and right side of the aircraft.

15. The aircraft according to claim 13, wherein the reconfigurable flight control system is configured to generate a pitching control of the aircraft while in the airplane mode by selectively actuating the left forward flap, the right forward flap, the left aft flap, and the right aft flap in any combination so as to produce a desired differential of lift between the forward wing and the aft wing of the aircraft.

16. The aircraft according to claim 13, wherein the reconfigurable flight control system is configured to selectively trim and sync a healthy actuator to a same position to that of a failed actuator, when the healthy actuator and the failed actuator are of symmetric positions on the aircraft.

17. A method of automatically reconfiguring flight control of an aircraft, comprising:
- detecting a failure of an actuator;
- determining whether reconfiguration is necessary based upon a risk factor, the risk factor is an empirical representation of a control authority of the aircraft, such that a degradation in the control authority effects the risk factor;
- seamlessly transferring flight control authority from a failed actuator to a back-up actuator; and
- managing the transfer of flight control authority to a back-up actuator with a sensor management tool so as to smooth any transient conditions that may otherwise occur.

18. The method according to claim 17, further comprising;
- mixing and mapping the use of actuators by continuously changing the percentage usage of each actuator on the aircraft.

19. The method according to claim 17, further comprising:
- implementing a symmetric control actuator arrangement so as to position a non-failed actuator in a same position as a failed actuator, the non-failed actuator and the failed actuator being symmetric actuators such that symmetric positioning of the non-failed actuator and the failed actuator provides aerodynamic stability to the aircraft.

* * * * *